United States Patent
Murai et al.

(10) Patent No.: US 7,148,442 B2
(45) Date of Patent: Dec. 12, 2006

(54) POWER SUPPLY DEVICE FOR ELECTRIC DISCHARGE MACHINING

(75) Inventors: Masao Murai, Gotenba (JP); Akiyoshi Kawahara, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/068,845

(22) Filed: Mar. 2, 2005

(65) Prior Publication Data

US 2005/0194947 A1 Sep. 8, 2005

(30) Foreign Application Priority Data

Mar. 4, 2004 (JP) ............................. 2004-060868

(51) Int. Cl.
*B23H 1/02* (2006.01)
*G05F 1/40* (2006.01)

(52) U.S. Cl. .................... 219/69.13; 320/166; 323/271

(58) Field of Classification Search ............ 219/69.13, 219/69.18, 130.1, 137 PS; 320/166, 167; 307/109; 323/266, 271, 282, 351
See application file for complete search history.

(56) References Cited

U.S. PATENT DOCUMENTS

| | | | |
|---|---|---|---|
| 3,832,510 A * | 8/1974 | Pfau et al. ............... | 219/69.13 |
| 4,710,603 A | 12/1987 | Obara et al. | |
| 5,580,469 A * | 12/1996 | Magara ................... | 219/69.18 |
| 6,366,063 B1 * | 4/2002 | Sekii .......................... | 323/271 |
| 6,710,582 B1 * | 3/2004 | Watanabe ................... | 323/282 |

FOREIGN PATENT DOCUMENTS

| | | | |
|---|---|---|---|
| JP | 60-180718 | | 9/1985 |
| JP | 01153220 | | 6/1989 |
| JP | 1-210219 | | 8/1989 |
| JP | 4-105819 A | * | 4/1992 |
| JP | 06-110544 | | 4/1994 |
| JP | 7-237039 A | * | 9/1995 |
| JP | 2002172575 | | 6/2002 |

OTHER PUBLICATIONS

European Search Report for Application No. 05251220.9; dated Jul. 18, 2006.
Japanese Office Action for Application No. 2003-310409; dated Jul. 24, 2006.

* cited by examiner

*Primary Examiner*—Geoffrey S. Evans
(74) *Attorney, Agent, or Firm*—Staas & Halsey LLP

(57) ABSTRACT

An electric-discharge-machining power supply device in which energy loss is hardly produced and a charge voltage of a capacitor is easily controlled. When a switching element SW1 is turned on, a capacitor C is charged via an inductor L. When the voltage Vc of the charged capacitor exceeds the voltage of a direct-current power source E, a current is returned to the power source E via a diode D2. When the switching element SW1 is turned off, energy stored in the inductor L flows from the inductor L through the diode D2, the power source E and the diode D1, so that the voltage Vc of the capacitor C is kept at the power source voltage. When a switching element SW2 is turned on, the voltage of the capacitor is applied between an electrode and a workpiece.

4 Claims, 3 Drawing Sheets

FIG. 1
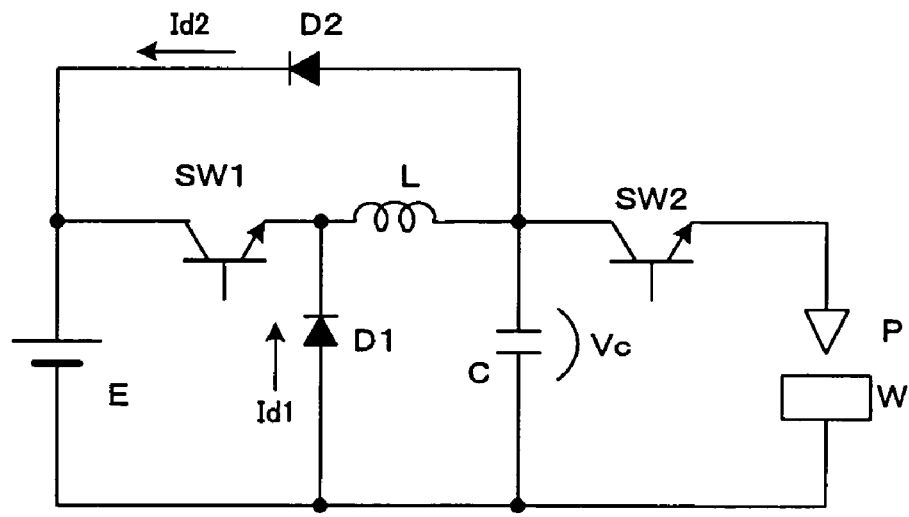
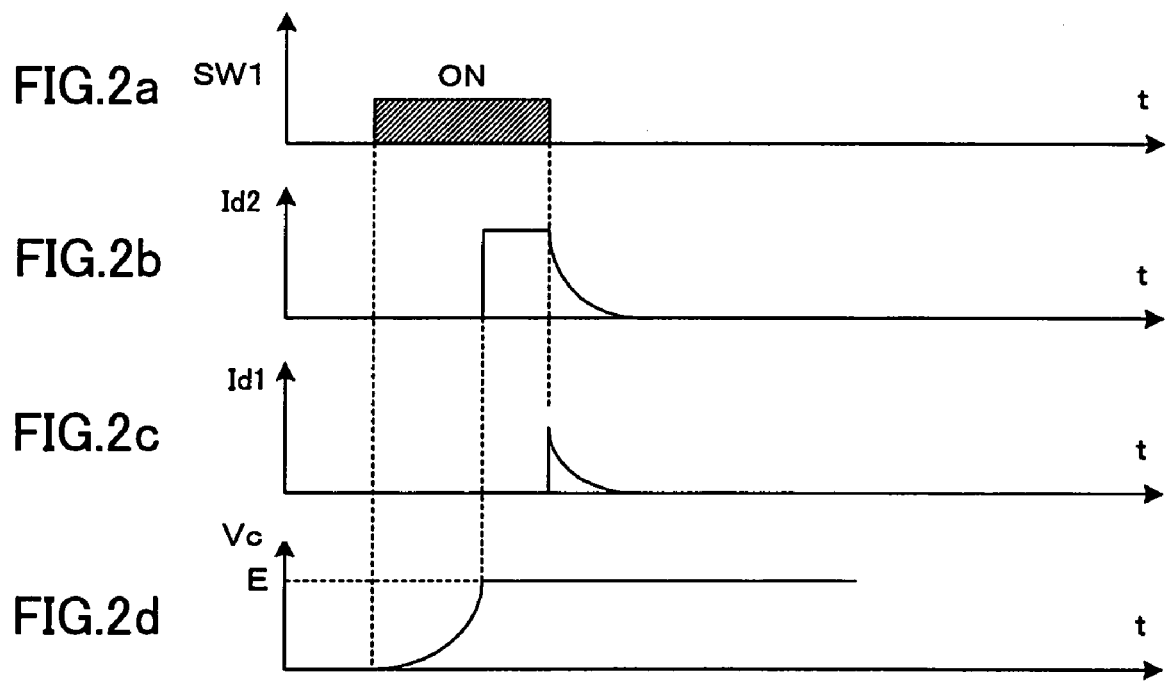

PRIOR ART    FIG. 3
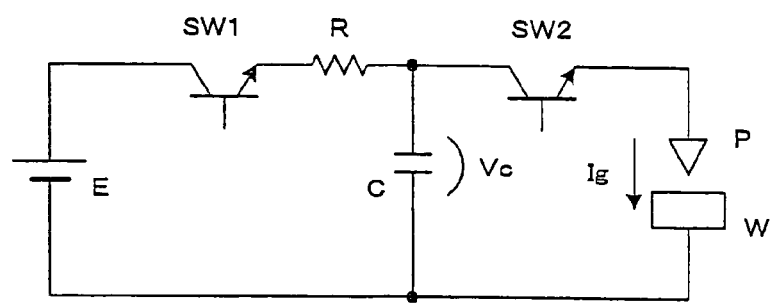
FIG.4a
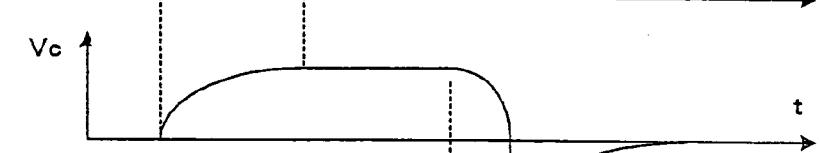
FIG.4b
FIG.4c
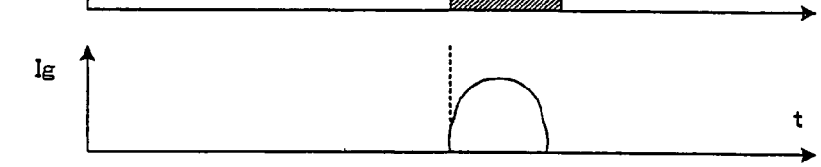
FIG.4d …

POWER SUPPLY DEVICE FOR ELECTRIC DISCHARGE MACHINING

BACKGROUND OF THE INVENTION

1. Field of the Invention

The present invention relates to a power supply device for electric discharge machining, and in particular to a power supply device in which charging and discharging of a capacitor for storing electrical energy for the electric discharge machining is controlled by switching elements.

2. Description of Related Art

As means of improving a machining speed using a capacitor-type machining power supply device which charges a capacitor and applies the voltage of the charged capacitor between a workpiece and an electrode to cause electric discharge to perform machining, there is known a capacitor-type power supply device for electric discharge machining comprising switching elements for controlling the charging and discharging of the capacitor. FIG. 3 is an example of the capacitor-type power supply device for electric discharge machining in which the control of the charging and discharging is performed by switching elements.

This power supply device for electric discharge machining is designed to charge a capacitor C from direct-current power source E via a first switching element (transistor) SW1 and a current limiting resistor R, and then apply the voltage of the charged capacitor C between an electrode P and a workpiece W via a second switching element (transistor) SW2 to cause electric discharge between the electrode C and the workpiece W to machine the workpiece W.

FIGS. 4a to 4d are operation timing charts in this power supply device for electric discharge machining. First, when the first switching element SW1 is turned on (FIG. 4a), a current flows from the direct-current power source E through the switching element SW1 and the resistor R to the capacitor C to charge the capacitor C, so that the voltage Vc of the capacitor increases as shown in FIG. 4b. When the first switching element SW1 is turned off and then the second switching element SW2 is turned on (FIG. 4c), the voltage Vc of the charged capacitor C is applied between the electrode P and the workpiece W, so that a discharge current Ig flows in between as shown in FIG. 4d to machine the workpiece.

This power supply device for electric discharge machining includes a resistor R to limit oscillation and a peak value of a current when the capacitor C is charged. The resistor R consumes energy. In principle, the resistor consumes as much energy as the capacitor C stores. Hence, the energy efficiency is low.

As a means of improvement, there is known a technique of liming a current using an inductor in place of a resistor (see JP60-180718A and JP 01-210219A).

FIG. 5 shows an example of a power supply device for electric discharge machining arranged to limit a charging current to the capacitor using an inductor. In this power supply device, an inductor L is connected in place of the resistor R in the power supply device shown in FIG. 3. Further, a diode D is connected in a reverse direction to be parallel with a series of direct-current power source E and a first switching element SW1. In the other respects, this power supply device is the same as the power supply device shown in FIG. 3.

FIGS. 6a to 6c are operation timing charts in this power supply device for electric discharge machining until the capacitor C is charged. When the first switching element SW1 is turned on (FIG. 6a), a current from the direct-current power source E flows through a closed loop comprising the first switching element SW1, the inductor L, the capacitor C and the direct-current power source E to charge the capacitor C, so that the voltage Vc of the capacitor increases as shown in FIG. 6c. When the first switching element SW1 is turned off, a current Id produced by energy stored in the inductor L flows through the diode D as shown in FIG. 6b to further charge the capacitor C. Specifically, a current Id produced by energy stored in the inductor L flows from the capacitor C, through the diode D, and then through the inductor L to charge the capacitor C, so that the voltage Vc of the capacitor further increases. Then, the second switching element SW2 is turned on to apply the voltage Vc of the capacitor between the electrode P and a workpiece W to cause electric discharge in between to perform machining.

The power supply device for electric discharge machining which limits a charging current using an inductor as shown in FIG. 5 hardly produces energy loss, and therefore it can be called an efficient power supply device for electric discharge machining. However, even when the first switching element for charging is tuned off, a current produced by energy stored in the inductor flows and charges the capacitor. Hence, it is difficult to control a charge voltage of the capacitor which is applied between the electrode and a workpiece. In order to control the charge voltage of the capacitor, it is necessary to accurately set an ON-time of the switching element by estimating charges supplied from the inductor, so that a control circuit of the switching element is complicated.

SUMMARY OF THE INVENTION

The present invention provides a power supply device for electric discharge machining in which energy loss is hardly produced and a charge voltage of a capacitor is easily controlled.

A power supply device of the present invention supplies electrical energy between a workpiece and an electrode for performing electric discharge machining. According to one aspect of the present invention, the power supply device comprises: a capacitor for storing the electric energy for the electric discharge machining; a charging circuit including a direct-current power source, a switching element and an inductor connected in series to charge the capacitor; a first diode connected in a reverse direction to be parallel with the series connection of the direct-current power source and the switching element; and a second diode connected in a reverse direction to be parallel with the series connection of the switching element and the inductor.

According to another aspect of the present invention, the power supply device comprises: a capacitor for storing the electrical energy for the electric discharge machining; a direct-current power source; a first switching element to be turned ON for charging the capacitor with electrical energy from the direct-current power source; a second switching element to be turned ON for discharging the electrical energy charged in the capacitor after the first switching element is turned OFF; the direct-current power source, the first switching element, an inductor, the second switching element, a gap between the electrode and the workpiece being connected in series, and the capacitor being connected in parallel with the series connection of the second switching element and the gap between the electrode and the workpiece, a first diode connected in parallel with the series connection of the direct-current power source and the first switching element; and a second diode connected in parallel with the series connection of the first switching element and the inductor.

With the present invention, the charging circuit for charging the capacitor does not include a resistor, so that energy loss is hardly produced. Further, electric energy stored in the inductor is returned to the power source. In this respect, energy loss is removed. Further, since the charge voltage of the capacitor (voltage to be applied between the electrode and a workpiece) is kept at the direct-current power source voltage, the charge voltage of the capacitor can be controlled to be a desired value by adjusting the power source voltage.

BRIEF DESCRIPTION OF THE DRAWINGS

FIG. 1 is a schematic circuit diagram representing a power supply device for electric discharge machining according to an embodiment of the present invention, FIGS. 2a to 2d are operation timing charts in this embodiment, FIG. 3 is a schematic circuit diagram representing a conventional capacitor-type power supply device for electric discharge machining in which control is performed using switching elements, FIGS. 4a to 4d are operation timing charts in the capacitor-type power supply device for electric discharge machining shown in FIG. 3.

DETAILED DESCRIPTION

FIG. 1 shows a power supply device for electric discharge machining according to an embodiment of the present invention.

Figures 5, 6B:
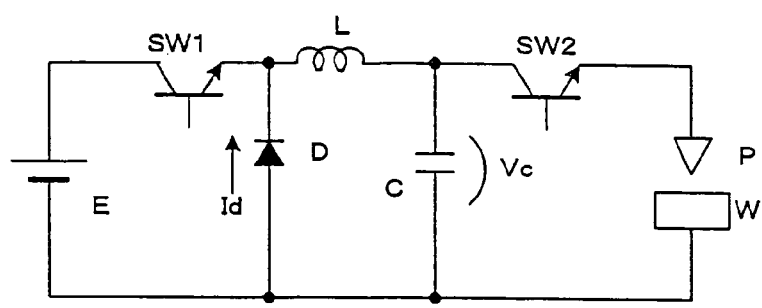
FIG. 5 is a schematic circuit diagram representing a conventional capacitor-type power supply device for electric discharge machining using an inductor in place of a resistor.
FIGS. 6a to 6c are operation timing charts in the capacitor-type power supply device for electric discharge machining shown in FIG. 5.
Figure 6A:
Figure 6C:
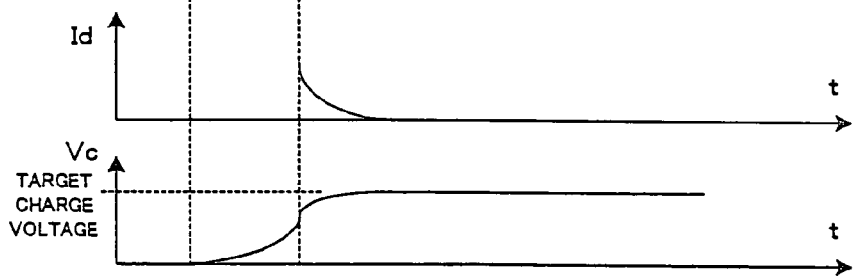

Direct-current power source E, a first switching element (transistor) SW1, an inductor L, a second switching element (transistor) SW2, an electrode P as one pole and a workpiece W as the other pole are connected in series. A capacitor C is connected between the second switching element (transistor) SW2 and the electrode P and workpiece W as the two poles to be in parallel. In other words, the capacitor C is connected in parallel with the series of the second switching element (transistor) SW2 and the electrode P and workpiece W as the two poles. Further, a first diode D1 is connected in a reverse direction between the direct-current power source E and the first switching element SW1 to be parallel with the series of the direct-current power source E and the first switching element SW1. As far as the structure described above is concerned, the present embodiment is the same as the conventional electric-discharge-machining power supply device using an inductor shown in FIG. 5.

A difference between this embodiment and the conventional power supply device for electric discharge machining is that a second diode D2 is connected between the first switching element SW1 and the inductor L to be parallel with the series of the first switching element SW1 and the inductor L. The second diode D2 is connected such that a direction from a point of connection with the capacitor C to a point of connection with the direct-current power source E is a forward direction of the diode D2.

FIGS. 2a to 2d are operation timing charts in this power supply device for electric discharge machining until the capacitor is charged.

As shown in FIG. 2a, when the first switching element SW1 is turned on, the capacitor C is charged from the direct-current power source E via the first switching element SW1 and the inductor L, as shown in FIG. 2d. When the voltage Vc of the capacitor C exceeds the power source voltage, the second diode D2 becomes conductive, so that a current, which was flowing to the inductor L, flows through the diode D2 and the switching element SW1 and does not flow to the capacitor C, as shown in FIG. 2b. As a result, the voltage Vc of the capacitor C is kept at the power source voltage as shown in FIG. 2d. Next, when the first switching element SW1 is turned off, energy stored in the inductor L flows as a current Id1 through the first and second diodes D1 and D2. Specifically, the energy stored in the inductor L flows from the inductor L through a closed loop comprising the second diode D2, the direct-current power source E, the first diode D1 and the inductor L.

Then, when the second switching element SW2 is turned on, the voltage of the capacitor C is applied between the electrode P and the workpiece W, so that electric discharge is caused and machining is performed. In this respect, the present embodiment is the same as the conventional device.

As stated above, in this embodiment, the charging circuit for the capacitor C does not include a resistor, so that energy loss caused by a resistor is removed. Energy loss is also prevented by returning the energy stored in the inductor L during charging to the direct-current power source E. Further, the voltage of the charged capacitor C is kept at the power source voltage. Hence, by adjusting the power source voltage, a desired voltage of the capacitor C can be obtained, irrespective of the ON-time of the switching element for charging. Thus, the charge voltage of the capacitor (voltage applied between the electrode and a workpiece) can be controlled accurately.

What is claimed is:

1. A power supply device for supplying electrical energy between a workpiece and an electrode for performing electric discharge machining, comprising:
    a capacitor for storing the electric energy for the electric energy for the electric discharge machining;
    a charging circuit including a direct-current power source, a switching element and an inductor connected in series to charge said capacitor;
    a first diode connected in a reverse direction to be parallel with the series connection of the direct-current power source and the switching element; and
    a second diode connected in a reverse direction to be parallel with the series connection of the switching element and the inductor;
    wherein after the capacitor is charged and when the second diode becomes conductive, current flows through the second diode and the switching element and not through the capacitor, maintaining voltage of the capacitor at a power source voltage.

2. A power supply device for supplying electrical energy between a workpiece and an electrode for electric discharge machining, comprising:
    a capacitor for storing the electrical energy for the electric discharge machining;

a direct-current power source;

a first switching element to be turned ON for charging said capacitor with electrical energy from said direct-current power source;

a second switching element to be turned ON for discharging the electrical energy charged in the capacitor after said first switching element is turned OFF;

said direct-current power source, said first switching element, an inductor, said second switching element, a gap between the electrode and the workpiece being connected in series, and said capacitor being connected in parallel with the series connection of the second switching element and the gap between the electrode and the workpiece, a first diode connected in parallel with the series connection of the direct-current power source and said first switching element; and a second diode connected in parallel with the series connection of said first switching element and the inductor wherein after the capacitor is charged and when the second diode becomes conductive, current flows through the second diode and the switching element and not through the capacitor, maintaining voltage of the capacitor at a power source voltage.

3. A method of supplying electric power between an electrode and a workpiece, comprising:

charging a capacitor with current flowing through a switching element, an inductor and a power source connected in series, the capacitor being connected between the inductor and the power source and being charged when the first switching element is turned ON; and maintaining voltage of the capacitor at a voltage of the power source prior to electric discharge by preventing the capacitor from receiving current flowing to the inductor by directing the current through a closed loop including a second diode connected in parallel with the series of the first switching element and the inductor, the power source, a first diode in parallel with the series of the first switching element and the inductor.

4. The method of supplying electric power according to claim 3, wherein when a second switching element connected in series to the electrode and the workpiece and the capacitor connected in parallel with the series of the second switching element, the electrode and the workpiece is turned ON, the capacitor voltage is applied between the electrode and the workpiece.

* * * * *

UNITED STATES PATENT AND TRADEMARK OFFICE
CERTIFICATE OF CORRECTION

PATENT NO. : 7,148,442 B2
APPLICATION NO. : 11/068845
DATED : December 12, 2006
INVENTOR(S) : Masao Murai et al.

It is certified that error appears in the above-identified patent and that said Letters Patent is hereby corrected as shown below:

Column 5, Line 19, after "inductor" insert --;--.

Signed and Sealed this

Eighth Day of May, 2007

JON W. DUDAS
*Director of the United States Patent and Trademark Office*